(No Model.) 2 Sheets—Sheet 1.
W. H. DOANE & G. W. BUGBEE.
LATHE FOR TURNING IRREGULAR FORMS.
No. 321,423. Patented July 7, 1885.
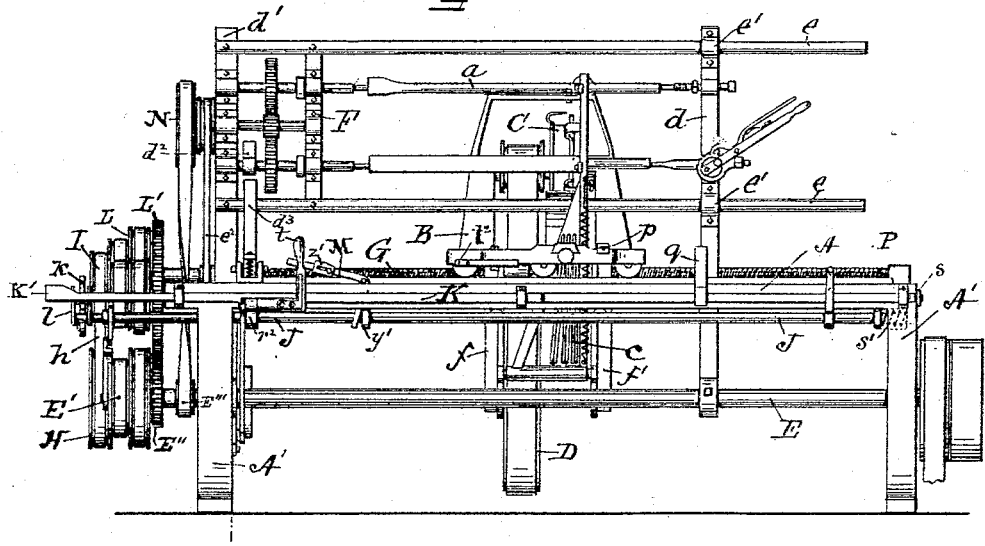
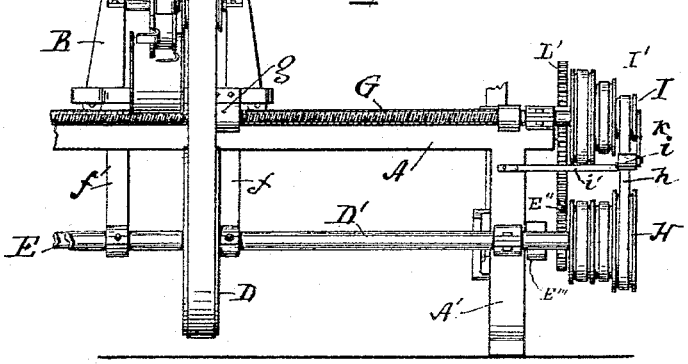
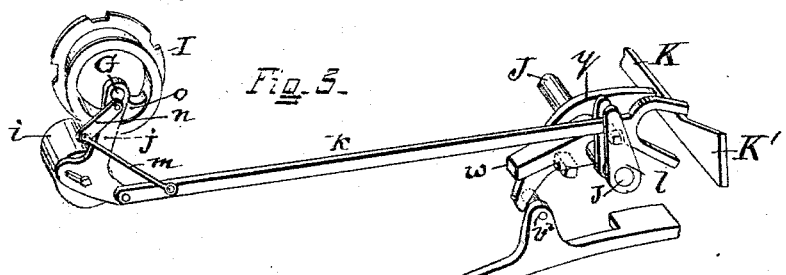
Attest
Carl Spengel
Charles Shappell
Inventor
William H. Doane
George W Bugbee
by Lett Hosea Atty.

(No Model.) 2 Sheets—Sheet 2.

W. H. DOANE & G. W. BUGBEE.
LATHE FOR TURNING IRREGULAR FORMS.

No. 321,423. Patented July 7, 1885.

Attest
Carl Spengel
Charles Shappell

Inventors
William H. Doane
George W. Bugbee
by Roll Hosea Atty.

UNITED STATES PATENT OFFICE.

WILLIAM H. DOANE AND GEORGE W. BUGBEE, OF CINCINNATI, OHIO.

LATHE FOR TURNING IRREGULAR FORMS.

SPECIFICATION forming part of Letters Patent No. 321,423, dated July 7, 1885.

Application filed August 9, 1883. (No model.)

*To all whom it may concern:*

Be it known that we, WILLIAM H. DOANE and GEORGE W. BUGBEE, citizens of the United States, residing at Cincinnati, Ohio, have invented new and useful Improvements in Lathes for Turning Irregular Forms, of which the following is a specification.

Our invention relates to lathes for turning irregular forms, its object being to improve their construction and efficiency, particularly adapting them to turning wheel-spokes and similar objects. These improvements consist, mainly, first, in the means employed for automatically controlling and varying the speed of the cutter-carriage and spindle-frame to suit the work under way and adjustable thereto; second, in the means employed for automatically arresting the forward travel of the cutter-carriage at the completion of the work; third, in the means employed for automatically arresting the backward travel of the carriage at the proper point for beginning work anew; fourth, in the mechanism for arresting the movement of the carriage and spindles at any desired point, and retaining the same in a condition of suspended operation, and of causing a resumption of the work, as desired; fifth, in the provision and construction of mechanism for insuring the arrest of the spindle rotation at a fixed predetermined point for convenience of adjusting a new blank in proper relation to the pattern; sixth, in the mechanism for arresting the momentum of the carriage-moving devices at the limit of backward travel; seventh, in certain details of construction, other than those mentioned, conducing to a more efficient and convenient operation of the machine as a whole for useful purposes.

Figure 4:
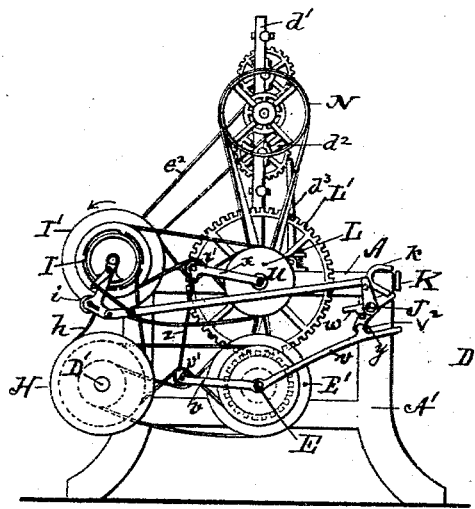
Figure 5:
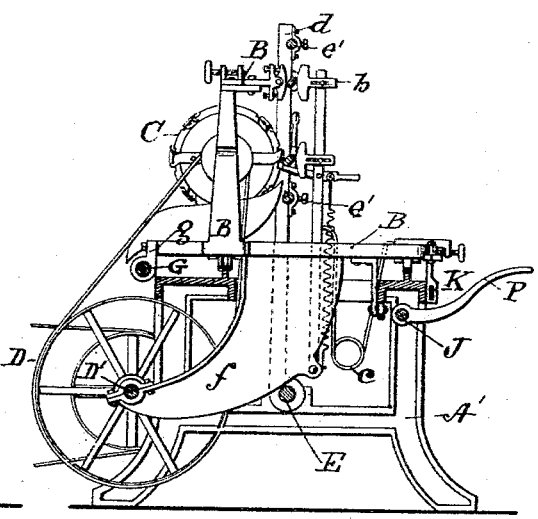
Figure 6:
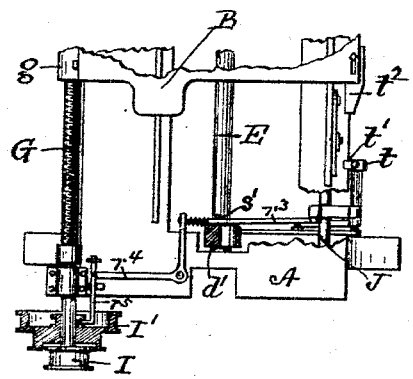
Figure 7:
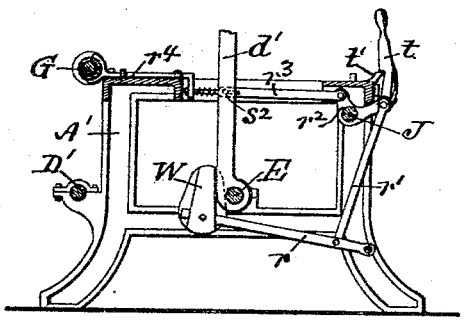
Figure 8:
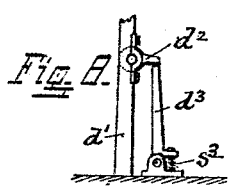

Mechanism embodying our invention is illustrated in the accompanying drawings, in which Figure 1 is a front elevation of our improved lathe complete; Fig. 2, a partial rear elevation showing the cutter-driving mechanism and the cutter-carriage and the feed-screw attachments; Fig. 3, a detail perspective view of the mechanism for reversing the action of the screw shaft controlling the movement of the carriage; Fig. 4, an end view of the lathe, showing the system of pulleys and gears for driving the cutter-carriage and the pattern and work spindles at differential speeds, and also the automatic devices for controlling these and the reversal of the carriage. Fig. 5 is a cross-sectional elevation through the lathe formed of the cutter-carriage. Fig. 6 is a partial plan view of the lathe, showing in detail the automatic devices involved in reversing the screw-shaft. Fig. 7 is a partial cross-sectional elevation of the lathe, showing the reversing devices and attachment for holding the vibrating frame out of contact. Fig. 8 is a detail elevation of the dog and stop for arresting the rotation of the work-carrying spindle; and Fig. 9 a detail of the device for holding the parts inoperative.

The parts hereinafter referred to are designated on the drawings by letters of reference.

In the accompanying drawings, A designates the lathe-bed, supported upon end supports, A', upon which, in suitable ways, a carriage, B, is reciprocated, mounted on friction-rollers and carrying a revolving cutter-head, C, driven by belting from a pulley, D, upon a driving counter-shaft, D', arranged in bearings at the rear of the lathe-bed parallel to the carriage-ways. In front of the carriage, and secured below upon a pivot-shaft, E, held in bearings between the end supports of the lathe-bed, a rectangular frame, F, adjustable in length horizontally, as hereinafter described, is arranged to vibrate as impelled by contact of the pattern *a*, rotating in the frame F, against an adjustable but normally fixed guide-stop, *b*, secured to the upper part of the carriage B, and operating against the tension of a spring, *c*, attached to the lathe-bed and vibrating frame, and holding the latter by its pattern normally against its pattern-guide.

The general construction and arrangement of these parts, excepting as hereinafter described, and including the driving mechanism immediately concerned in rotating the pattern and the object being turned, is substantially such as is common in modern lathes of this description, and requires no further special description. The right-hand end post, *d*, of the frame F, however, is adjustable inward horizontally upon its pivot-shaft E toward the corresponding post, *d'*, at the opposite end, adjustable connections being provided for this purpose with the horizontal slats *e e*, which, with the end posts, constitute the frame. These adjustable connections consist of caps *e'*, securing the horizontal slats to the vertical posts $d$ $d'$, held by bolts which may be loosened for the purpose of adjustment, and again tightened to secure the parts in place. A set-screw holds the post $d$ to its pivot-shaft E, and is manipulated in the same manner; and by these means the vibrating frame F is rendered adjustable in length horizontally to take in different lengths of work without rendering the frame top-heavy by the weight of the ordinary appliances for this purpose.

The mechanism for shifting the plane of driving power to accommodate the movements of the carriage is constructed as follows: The driving-shaft D' is provided with a longitudinal open slot at one side throughout its length, and the driving-pulley D with a corresponding feather engaging therein, which permits the pulley D to be shifted laterally upon the driving-shaft D' without affecting its rotation. This shifting movement is accomplished by two downwardly-projecting arms, $f$ $f'$, attached to the carriage B, which curve rearward and loosely embrace the shaft D', one at each side of the pulley. Thus by the reciprocation of the carriage the pulley D is also shifted laterally in a corresponding degree upon its shaft, whereby the cutter-head C is maintained in constant rotation by its driving-belt in any position upon its shaft. The carriage B is reciprocated by means of a horizontal screw-shaft, G, arranged in bearings upon the lathe-bed in rear of and parallel to the carriage-ways, and passing through and engaging a rear projection, $g$, of the carriage. The screw-shaft receives its motion backward direct from the driving shaft D' by a belt, $h$, from a pulley, H, at the end of the driving-shaft to a corresponding pulley. I, at the end of the screw-shaft, where both project outward beyond the lathe-bed. The belt $h$, which is normally loose and inoperative during the forward motion of the machine, is brought into operation by a tightening-idler, $i$, pivoted upon a swinging arm. $j$, articulated upon the projecting end of the screw-shaft and controlled by a catch-lever, $k$, extending forward to the front of the lathe-bed. The lever is retained in its forward position (holding the belt $h$ tight upon its pulleys H I) by means of an open slot or recess in its under side near its forward end catching upon the wrist-pin of a crank, $l$, attached to a horizontally-sliding shaft, J, journaled beneath the lathe-bed proper from end to end, and at its extreme forward end the lever $k$ is bifurcated, its upper arm being bent over to rest upon a sliding bar, K, arranged horizontally in bearings at the front of the lathe-bed. The bar K is widened outward in wedge form at its forward extremity, as at K', to present in its longitudinal movement an inclined plane to the lever $k$, and by thus raising the lever actuate, by means of a short connecting-rod, $m$, and crank $n$, a friction clutch or brake, $o$, pivoted in the swinging arm $j$ and acting against the inner periphery of the pulley I. The momentum of the screw-shaft is expended in drawing back the lever $k$, and is arrested by means of the clutch acting as a brake, which movement also throws off the tightening-idler $i$ and renders the belt $h$ inoperative. This action is assisted by a spring, $i'$, attached to the lathe-bed. The horizontal movement of the bar K by which the lever $k$ is thus disengaged is effected by the carriage B by means of a horizontal arm, $p$, projecting forward therefrom over the lathe-bed and striking a vertical stop-finger, $q$, secured upon the bar K in position to be actuated at the proper limit of the backward travel of the carriage, a spring, $s$, being provided at the remote end of the bar K to restore it to its normal position when the carriage again moves forward. While disengaged from the bar K the lever $k$ rests by means of the lower arm of its bifurcation upon the crank-pin of the crank $l$ in convenient position for re-engagement, as hereinafter described.

The mechanism concerned in the forward movement of the carriage is as follows: Adjacent to the pulley I upon the extended screw-shaft is a loose double band-pulley, I', arranged to have a limited sliding movement upon the shaft G into and out of engagement with the fixed pulley I as a clutch, by means of suitable stops upon their adjacent faces. The sliding and disengagement of the pulley I' is effected by a weight, W, secured to the end of a lever, $r$, pivoted to the lathe-supporting frame, and operating by means of a link, $r'$, a bell-crank, $r^2$, pivoted on the shaft J, and thence by a similar link, $r^3$, and a bell-crank, $r^4$, horizontally arranged upon the lathe-bed, a sliding bar, $r^5$, controlling the pulley I' through the medium of an ordinary yoke and collar upon the pulley-hub. The gravitating action of the weight W is further increased when in operation by being elongated vertically in relation to the approximately horizontal lever on which it is mounted, whereby as the weight falls, carrying the lever below the horizontal position, the effective leverage is increased. This action is made effective through the system of connections last described in withdrawing the loose pulley I' from engagement with its fixed pulley I, and the lever $r$, with the attached weight W, is normally upheld by a catch-arm, $t$, secured to the bell-crank $r^2$, and engaging by a suitably-formed recess with a stud, $t'$, upon the lathe-bed. The catch $t$ when engaged stands vertically in front of the lathe-bed, and is thrown off its supporting-stud by a cam-finger, $t^2$, upon the front of the carriage, arranged to act when the latter reaches the desired limit of its forward movement, said forward movement being given to the carriage by power transmitted in the manner hereinafter described to the loose pulley I' and thence to the screw-shaft by its described engagement with its fixed engaging-pulley I.

The mechanism for imparting a forward travel to the carriage B is in the present case arranged to give a differential speed thereto, with reference more particularly to the work of turning wheel-spokes, the object being to produce a slower motion of the carriage as the cutter approaches the base or throat of the spoke, where the contour of the spoke changes from an oval to a more nearly rectangular section.

Figure 9:
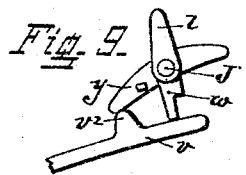

The shaft E, already described, is projected forward through the lathe-supporting frame, its extended end serving as a stud, on which is loosely mounted a differential two-belted idler-pulley, E', carrying a spur-pinion, E'', (indicated by dotted lines in Fig. 4,) at the rear, all being cast or secured together as one. Immediately above the pulley E' is a similar differential idler-pulley, L, with a somewhat larger spur-wheel, L', attached thereto in the same manner, pivoted upon a stud, $u$, Fig. 1, projecting from the lathe bed. The differential pulleys E' and L and the spur-wheels L' E'' are proportioned respectively to produce the desired motion, and are arranged to bring the belt-faces of the pulleys, respectively, in the plane of the pulleys H and I', before described, the two latter pulleys being also differential, and all being flanged on both sides of the belt-space to guide and preserve the belts in place when loosened. The motion of the driving-pulley H is transmitted to the idler-pulley E' by one of two belts connecting their differential faces, alternately tightened or loosened to produce differing speeds by a tightening-idler, $v'$, pivoted upon a stud held upon a radius-arm, $v$, swinging from the end of the shaft E, the arm with its idler-roller being so arranged that on being raised one of its belts is tightened for operation and the other at the same time loosened, and vice versa, when lowered. A precisely similar arrangement of belting is made to connect the pulley L with the pulley I', the alternate tightening and loosening of the belts being effected by a similar construction and arrangement of an idler, $x'$, and radius-arm $x$ articulated upon the end of the stud $u$ parallel to the arm $v$, and operated from and in unison therewith by a connecting-rod, $z$. The motion of the pulley E' is transmitted to the pulley L by the spur-gears before mentioned. The movement of the radius-arms $v$ and $x$, and the consequent change of speed of the pulleys controlling the screw-shaft in its forward movement, is effected by the following mechanism: The radius-arm $v$ is extended forward and upward immediately beneath the shaft J, where it is held downward against the counteracting weight of the two radius-arms and their rollers by a curved dog, $y$, secured upon the shaft J in contact with a projection, $v^2$, at the upper side of the extended arm $v$ at that point. When the shaft J is shifted longitudinally rearward, it carries the dog $y$ aside from and out of the plane of the projection $v^2$, which releases the extended arm $v$, the weight of the radius-arms and rollers at the other end being sufficient by their fall to carry the second system of belts into engagement and release the first to slacken the speed of the carriage forward. The longitudinal shifting of the shaft J is effected by a bell-crank, M, pivoted in an opening in the lathe-bed, having a vertical arm projected downward and bifurcated to embrace the shaft J adjacent to a fixed collar, $y'$, thereupon, and with an approximately horizontal arm extending forward and inclining upward beneath and in the path of the carriage B. The latter arm of the bell-crank is provided with an adjustable cam-block, $z'$, with which the carriage comes in contact in its forward travel, and by its weight bears down the same, thus actuating the bell-crank M and shifting the shaft J rearward against the force of a spring, $s'$, at its remote end. (Indicated by dotted lines in Fig. 1.) This movement, which disengages the extended arm $v$ and changes the operating-belts on the system of pulleys before described, and results in slackening the speed of the carriage, occurs shortly before the release of the catch-arm $t$, and is regulated as to its period of occurrence by adjusting the cam-block $z'$ upon its arm according to the nature of the work to be performed by the machine. Whenever it is desired to arrest the action of the carriage, as in case of breakage or other cause of detention, a loose dog or finger, $w$, hung upon the shaft J adjacent to and resting upon the curved dog $y$, is thrown over by hand and falls to a vertical position and the extended arm $v$ depressed until it catches beneath it, the length of the dog $w$ being just sufficient thereby to relieve both sets of belts upon the pulleys H E' and L I'. The dog $w$ being restored to its former position, the radius-arms again drop, and the operation of the machine is resumed. The position of the dog $w$ in the relation required for the suspended operation is shown in Fig. 9 and its normal position of disengagement in Fig. 3. In the former the belts play loosely upon the designated pulleys, and the action of the carriage and of the work and pattern spindles is for the time being suspended.

The mechanism for arresting the action of the spindles is as follows: The spindles are driven by intermeshing spur gears in the usual manner, actuated by belt-connection from a pulley, E''', adjacent to and connected with the pulley E' to a pulley, N, on the spindle-driving counter-shaft. The rotation of the spindles ceases, therefore, when the pulley E' ceases its revolution; but in order to insure the stoppage of the spindles at a fixed predetermined point, as a means of facilitating the adjustment of new work in place for the action of the cutter, a small dog, $d^2$, secured upon the lower spindle-shaft, is arranged to rotate in the immediate vicinity of a standard or stop, $d^3$, rising from the lathe bed in such relations that when the vibrating frame is drawn forward by the mechanism already described out of range of the cutter-head the dog $d^2$ engages upon the top of the standard $d^3$, as shown in Fig. 8, thus arresting the action of the spindles at that point. The standard $d^3$ is arranged to have a rule-joint pivotal action to the rear against the tension of a spring, $s^3$, to permit the dog to pass and continue its rotation until the vibrating frame is brought far enough forward to insure a full and perfect engagement of the dog upon the arresting-standard.

As an additional, but not essential, means of insuring the rotation of the spindles to the proper point, we avail ourselves of the momentum of the screw-shaft G by a belt-connection, $e^2$, therefrom to the pulley N, which is for this purpose provided with a second belt-face. The belt $e^2$ is normally loose and inoperative, but is brought into operation by the forward movement of the vibrating frame out of range of the cutter. Should the rotative momentum of the other parts fail to carry the spindles far enough for the proper action of the dog $d^2$, the supplemental belt-connection $e^2$ insures such action; but ordinarily the latter may be dispensed with.

The consecutive operation of the machine is as follows: The carriage B having completed its rearward travel, and in so doing having disengaged its driving-pulley belt $h$, the bar K is held by the carriage against the force of its spring $s$ until released by the forward movement of the carriage. A new blank being placed upon the spindles in the vibrating frame, the lathe is started by raising up the catch-lever $t$ and engaging it upon its stud $t'$ into the position shown in Fig. 7, thus raising the weighted lever $r$ and throwing the loose pulley I' into engagement with the fixed pulley I, thus connecting the counter-pulleys with the screw-shaft. Before this is done, however, the arm $v$ is depressed and engaged with the catch block or dog $y$ upon the shaft J, to provide for the change of speed caused, as hereinbefore described, by the automatic disengagement of these parts by the carriage. The carriage, having reached the limit of its forward travel and disengaged the pulley I', remains stationary until the operator engages the belt $h$, which is accomplished by first raising a hand-crank, P, attached to the shaft J, partially rotating the shaft, carrying the crank $l$ rearward to re-engage the catch-lever $k$, and then depressing the handle P and rotating the shaft J forward until the idler $i$ causes the engagement of the belt $h$. The latter movement also places the upper arm of the bifurcated lever $k$ in proper position upon the bar K, ready for disengagement by the carriage, as above described.

We claim as our invention, and desire to secure by Letters Patent—

1. In a lathe for turning irregular forms, the combination, with the main driving-shaft and screw counter-shaft by which the carriage is actuated, of a belt-connection between said shafts, a tightening-idler mounted in a swinging support pivoted to the counter-shaft, a catch connected with the swinging support, by which the idler is held in operative position, said catch adapted to be actuated to release the swinging support and idler by the motion of the carriage, substantially as described.

2. In a lathe for turning irregular forms, the combination of a differential or double-faced pulley mounted upon the main driving-shaft, a corresponding differential pulley mounted upon a counter or carriage-driving shaft, a double belt-connection between said pulleys, a tightening-idler mounted upon a radius-arm swinging from the end of the main shaft, the idler being located above and below said belts, and mechanism, substantially as described, for operating the radius-arm by the movement of the carriage, whereby the idler is elevated or lowered to its extreme limit for bringing it into operative contact with one or the other of said belts, and a differential speed thus transmitted to the carriage-driving shaft, substantially as and for the purpose specified.

3. In a lathe for turning irregular forms, the combination of a differential or double-faced pulley mounted upon the screw-shaft, a corresponding differential pulley mounted on a counter or spindle-driving shaft, a tightening-idler mounted upon an arm swinging from the end of the screw-shaft, a double belt-connection between said pulleys above and below said idler, a radius-bar on the main driving-shaft, differential pulleys with double belt-connections on the main driving-shaft and carriage-driving shafts, respectively, a tightening-idler mounted on the radius-bar, a link connecting the arm on the screw-shaft with the radius-bar so that they will move in unison, and mechanism, substantially as described, whereby the radius-bar, by the movement of the carriage, is elevated or lowered to its extreme limit, and the idlers thus brought into operative contact with the belts, to transmit a differential speed to the carriage and spindle driving shafts, substantially as and for the purpose specified.

4. In a lathe for turning irregular forms, the combination of differential pulleys on the main and screw driving shafts, corresponding differential pulleys on the carriage and spindle driving shafts, double belt-connections between each set of pulleys, an idler mounted upon a radius arm swinging from the main shaft, a similar idler mounted upon an arm on the screw-shaft, said idlers being adapted to be brought into operative contact with the belts by the movement of the carriage, a link connecting said arms together so that they will move in unison, and mechanism, substantially as described, for actuating the radius-arm and causing the idlers to assume an intermediate position between the belts of each belt-connection, and thus be out of operative contact therewith, substantially as and for the purpose described.

5. In a lathe for turning irregular forms, the combination of the differential or double-faced pulleys on the main driving-shaft and screw-driving shaft, corresponding differential pulleys on the carriage and spindle driving shafts, double belt-connections between each set of pulleys, tightening-idlers mounted upon arms swinging from the main and screw driving shafts, and adapted to be brought into operative contact with the belt-connections, respectively, as the swinging arms are elevated or lowered to their extreme limits, a connection between said arms so that they will move in unison, a catch-block for holding the arm on the main shaft in an elevated position, and holding the idlers in operative contact with one belt of each belt-connection, and an actuating-lever actuated by the movement of the carriage for releasing the catch-lever and allowing the idlers to fall or be depressed, and thus be brought into operative contact with the other belt of each belt-connection, whereby a differential speed is transmitted to the carriage and spindle driving shafts, substantially as described.

6. In a lathe of the character described, the combination, of the differential driving and transmitting pulleys H E' I' L, provided with double belts connecting them together in pairs, as described, the belt-tightening idlers located above and below the two belts of each pair, respectively, whereby they will be brought into operative contact therewith as they are elevated or lowered to their extreme limits, the swinging arms carrying said idlers connected together by a link so as to move in unison, a holding-lever by which said arms and idlers are retained in one position against their gravitating tendency toward the other, and a sliding bar adapted to hold and release said lever, and actuated by the movement of the carriage, substantially as and for the purpose described.

7. In a lathe of the character described, the sliding bar J, provided with mechanism for its actuation by the cutter-carriage, and with the curved catch-block $y$, in combination with the extended arm $v$, pivoted to the main shaft E, and provided with the projection $v^2$, the idler mounted upon the other end of the arm $v$, and the differential pulleys and belt-connections, substantially as and for the purpose described.

8. In a lathe for turning irregular forms, the combination of a cutter-carriage reciprocated by a screw-shaft, with a fixed pulley on said shaft for imparting backward motion thereto, driven by a belt-connection normally loose, but held in operative contact by an adjustable tightening-idler, a loose pulley on said shaft adjacent to the fixed pulley, and provided with lateral projections for engaging said screw-shaft through said fixed pulley as a clutch, and mechanism, substantially such as described, for shifting said loose pulley and said belt-tightening idler into and out of engagement, substantially as set forth.

9. In a lathe for turning irregular forms, the combination of a reciprocating cutter-carriage with a screw-shaft for driving the same, and a work-carrying frame, a loose pulley for giving forward motion to the carriage, adapted to be shifted into and out of connection with a fixed clutch upon the screw-shaft, provided with a shifting yoke, and a connected system of levers and an attached weight for simultaneously releasing the clutch-connection and withdrawing the work-frame from the cutter, and a catch for holding said pulley and work-frame in operative positions, arranged to be tripped and released by the movement of the carriage, substantially as set forth.

10. In a lathe for turning irregular forms, the combination of the screw-shaft, reciprocating cutter carriage, work-carrying frame, loose pulley on the screw-shaft adapted to engage the fixed clutch, the shifting yoke and connected system of levers, the catch-arm arranged in the path of the carriage, and the weight arranged as described to increase the effective leverage in falling when the catch is released, substantially as set forth.

11. In a lathe for turning irregular forms, the moving carriage, the catch-arm $t$, arranged in the path of the carriage, bell-crank $r^2$, connected with said catch, a weighted lever connected with said bell-crank by a link, and a link, $r^3$, provided with a slot, $s^2$, engaging a pin upon the vibrating frame, combined substantially as set forth.

12. In a lathe for turning irregular forms, the vibrating work-carrying frame, the advancing-spring $c$, for impelling said frame toward the cutters, and a weighted lever, and connections, substantially as described, for withdrawing said frame from engagement with the cutters, in combination, substantially as and for the purpose set forth.

13. In a lathe of the character described, a screw-shaft for driving the cutter-carriage, a loose belt-connection between said screw-shaft and the driving-pulley shaft, a tightening-idler arranged to disengage and engage said belt, and connecting mechanism, substantially as described, leading to the cutter-carriage, whereby the idler is shifted by the movement of the carriage, combined substantially as set forth.

14. In a lathe of the character described, the combination of the pulley I, and its belt-connection for giving backward motion to the carriage, the tightening-roll $i$, controlled by the carriage through mechanism substantially such as described, and a friction clutch or brake operating on said pulley or shaft when the belt-roll is released to check the momentum of the shaft when the driving-power is withdrawn, substantially as set forth.

15. In a lathe of the character described, the combination of a screw-driven cutter-carriage with the pulley I on the screw-shaft, the swinging arm $j$, pivoted in the axis of said pulley, the friction clutch or brake $o$, arranged to bear on said pulley, the actuating-crank and connecting-rod $n$ $m$, and the controlling-link $k$, connecting with the arm $j$ and rod $m$, in combination with suitable mechanism adapted to hold said link and retain said friction-clutch inoperative until released and rendered operative by the movement of the carriage, substantially as and for the purpose set forth.

16. In a lathe of the character described, the combination of the screw-shaft G, its pulley I, belt-connection, tightening-idler mounted in the arm $j$, pivoted to the shaft G, the catch-lever $k$, connected with said arm $j$, the sliding bar K, having tripping head K', for engaging and releasing said catch-lever, and mechanism, substantially as described, for actuating said catch-lever, substantially as and for the purpose specified.

17. In a lathe of the character described, the combination of the movable carriage, screw-shaft G, pulley I, belt-connection, the idler $i$, mounted in the arm $j$, pivoted to the shaft G, the catch-lever $k$, sliding bar K, actuated by the carriage to release the catch-lever, the crank $l$, and manipulating-handle for returning the catch-lever to its normal position of engagement, substantially as described.

18. In a lathe of the character described, the combination of the movable carriage, screw-shaft G, pulley I, loose belt-driving connection, the idler $i$, mounted in the arm $j$, pivoted to the shaft G, the catch-lever $k$, connected to said arm $j$, the sliding bar K, with tripping-head K', actuated by the carriage, and a spring, $s$, for restoring it to its normal position after the actuation by the carriage, substantially as described.

19. In a lathe of the character described, a swinging work-carrying frame, a spindle-shaft journaled therein and provided with a dog or stop, $d^2$, in combination with an arresting-standard arranged in such relation to the dog as to serve as a stop therefor when the frame is swung toward said stop, substantially as set forth.

20. In a lathe for turning irregular forms, the combination of a spindle-shaft having bearings in the vibrating frame, provided with a dog, $d^2$, on said spindle, with an arresting-standard, $d^3$, pivoted to the lathe-bed, and adapted to have a limited oscillation into the path of movement of the dog against the pressure of a spring, substantially as and for the purpose set forth.

21. In a lathe of the character described, the vibrating frame carrying a spindle, arresting mechanism, substantially as described, for stopping said spindle, and an auxiliary driving-belt leading from the carriage-driving mechanism to the spindle, said belt arranged to be slack when the frame is in operative relation to the cutter, but tightened by the movement of the frame away from the cutter, substantially as set forth.

In testimony whereof we have hereunto set our hands and seals in the presence of two subscribing witnesses.

WILLIAM H. DOANE. [L. S.]
   GEORGE W. BUGBEE. [L. S.]

Witnesses:
 SIMEON HARRIS,
 A. O. BLAKEMORE.